(No Model.)
M. McKINNON.
ANTIRATTLER FOR THILL COUPLINGS.
No. 528,338. Patented Oct. 30, 1894.
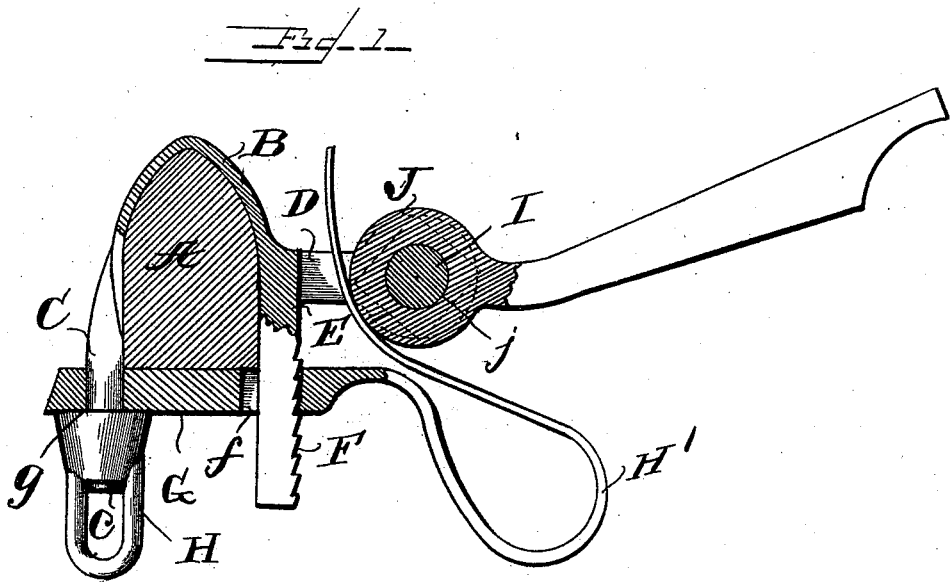
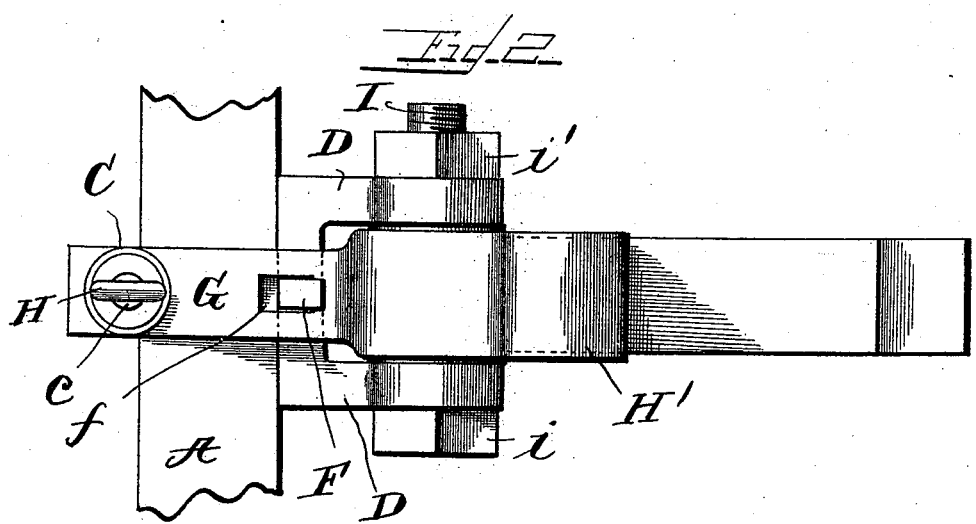
Witnesses
G. A. Tauberschmidt,
A. G. Keylman
Inventor
M. McKinnon
By Wm. H. Bates
Attorney

UNITED STATES PATENT OFFICE.

MARTIN McKINNON, OF MAXTON, NORTH CAROLINA.

ANTIRATTLER FOR THILL-COUPLINGS.

SPECIFICATION forming part of Letters Patent No. 528,338, dated October 30, 1894.

Application filed June 29, 1894. Serial No. 516,066. (No model.)

*To all whom it may concern:*

Be it known that I, MARTIN MCKINNON, a citizen of the United States, residing at Maxton, in the county of Robeson and State of North Carolina, have invented certain new and useful Improvements in Antirattlers for Thill-Couplings; and I do hereby declare the following to be a full, clear, and exact description of the invention, such as will enable others skilled in the art to which it appertains to make and use the same.

My invention relates to improvements in anti-rattlers for thill-couplings; and the object of the invention is to simplify, improve and reduce the cost of construction to a minimum of this class of inventions over the existing prior state of the art.

With these ends in view the invention consists in the novel construction and combination of parts as will be hereinafter more fully described and particularly pointed out in the appended claim.

I have fully and clearly illustrated my invention in the accompanying drawings, in which—

Figure 1, is a side elevation of my device in accordance with my invention, and Fig. 2, is an inverted plan view of the same.

Similar letters of reference indicate corresponding parts in both figures.

Referring by letter to the drawings, A, designates the front axle of a vehicle which is snugly embraced by means of a clip B, having its rear portion terminating in a screw threaded shank C, as at $c$ and its forward portion terminating in a yoke or ears D, having its free ends bored oppositely for the passage therethrough of a coupling-pin or bolt which will be hereinafter described. The forward portion of this clip B, also terminates in a depending clip shank E, having serrations or notches F, formed upon its front face which is passed through a rectangular opening $f$, in a tie-plate G, said tie-plate engaging with the serrations or notches in the clip-shank E. The rear end of this tie-plate has a perforation $g$, formed in it for the passage therethrough of the screw threaded rear shank of the clip the threaded end of which takes into a correspondingly threaded perforation $g'$ formed in a suitable thumb-nut H, through the medium of which and the serrations upon the face of the forward clip shank the tie-plate is vertically adjusted to suit different sized axles. The forward end of this tie-plate terminates in a tension spring H' which is curved downwardly, forwardly and rearwardly the free end of which lies against the rear end of a thill-iron to be also hereinafter described.

I designates a coupling-bolt having a head $i$ upon one of its ends and its opposite end being screw threaded to take a correspondingly threaded nut $i'$, this bolt being passed through the bored ends of the yoke or ears and through a perforation $j$ formed in the cylindrical thill-iron J and by means of which the thill-iron and its shank are coupled to the clip-yoke an intervening open space being left between the thill-iron and yoke for the free-end of the spring to be passed.

By my construction of device it will be readily seen that the clip, yoke or coupling-ears, and depending rear and forward shanks are made in one piece and by making the latter $i.\ e.$ the forward shank with serrations or notches therein and of rectangular shape or square and a sharp ratchet like hole in the front of the tie-plate I dispense with the necessity of one nut and making the serrations or notches one-sixteenth of an inch apart that the clip as before stated will fit different sized axles and further that in dispensing with one nut and using the thumb-screw on the back shank I avoid the trouble of using wrenches in changing shafts or poles from one buggy to another. This thumb-screw can be worked with the hand and in changing from one buggy to another the whole clip can be removed from the axle and not affect the shaft eye at all.

Great importance is attached to this anti-rattler inasmuch as it is inseparably a part of the tie-plate and therefore it cannot get lost or misplaced and furthermore it can be used on any kind of vehicle either shaft or pole and it is durable strong and will never fail through wear or age to absolutely prevent rattling and is cheap to manufacture.

From the foregoing description taken in connection with the accompanying drawings the operation of my device will be obvious and further reference to the same herein is deemed unnecessary.

Having thus described my invention, what

I claim as new, and desire to secure by Letters Patent, is—

In a thill-coupling, the combination with the axle, of the clip having its rear screw-threaded shank provided with the thumb-nut, and its forward shank having its front face provided with serrations, a slotted tie-plate having its forward end terminating in a flat spring extending downwardly upwardly and rearwardly abutting against the rear portion of the thill-iron and extending upwardly and beyond the same, the thill-iron being secured within the yoke or ears by means of the bolt and nut, substantially as described and for the purposes set forth.

In testimony whereof I affix my signature in presence of two witnesses.

MARTIN McKINNON.

Witnesses:
E. McNair,
W. F. Henderson.